June 10, 1969  J. FEINMAN  3,448,761
VALVE FOR REGULATING FLOW OF HIGH-TEMPERATURE LIQUIDS
Filed Jan. 12, 1966

INVENTOR.
JEROME FEINMAN
By Donald G. Dalton
Attorney

United States Patent Office 3,448,761
Patented June 10, 1969

3,448,761
VALVE FOR REGULATING FLOW OF HIGH-TEMPERATURE LIQUIDS
Jerome Feinman, Monroeville, Pa., assignor to United States Steel Corporation, a corporation of Delaware
Filed Jan. 12, 1966, Ser. No. 520,148
Int. Cl. F16k 3/02, 25/04, 41/00
U.S. Cl. 137—375                                  5 Claims

ABSTRACT OF THE DISCLOSURE

A valve for regulating flow of high-temperature liquids, such as molten iron from a blast furnace. Includes refractory lined body, a vertically movable refractory plug mounted in the body, an upwardly extending rod fixed to the plug, and a bellows seal connected between the rod and body. The plug can be positioned through an automatic control means to maintain a desired flow rate through the body.

---

This invention relates to an improved valve for regulating flow of high-temperature liquids, such as molten metal or slag.

Although my invention is not thus limited, the valve is particularly useful as a means for regulating flow of hot metal or slag from a blast furnace which is tapped continuously. Previous structural arrangements for continuous tapping have embodied either a liquid column of variable height or an auxiliary vessel with a variable freeboard pressure for regulating the flow. Such arrangements have not been practical, partly because of their complexity and partly because of shortcomings in the materials of which they are constructed. Nevertheless it is apparent my invention has broader application where it is necessary to regulate flow of hot liquids, for example discharge of molten metal from a cupola.

An object of my invention is to provide an improved device for controlling the flow of hot liquids, which device is in the form of an adjustable plug-type valve constructed of suitable refractory.

A further object is to provide an improved valve for accomplishing the foregoing objective in which I utilize pressure of an inert gas to effect a seal.

Figure 1:
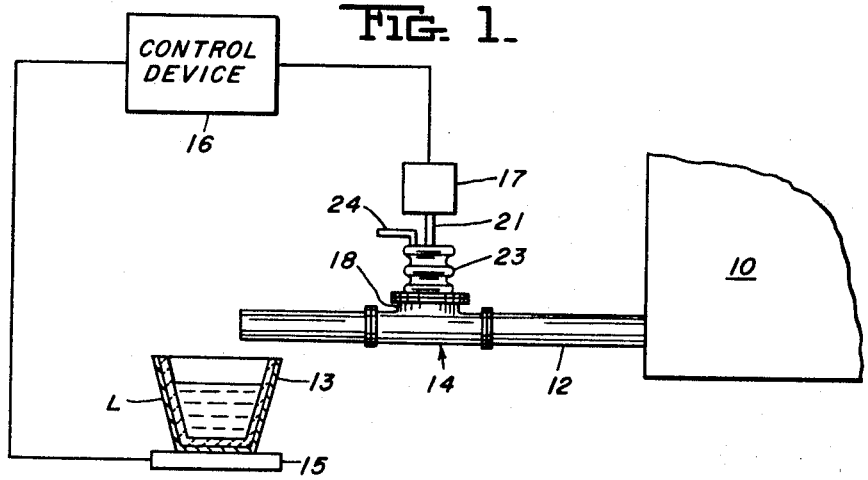
FIGURE 1 is a diagrammatic showing of a typical installation in which I use my valve.

FIGURE 1 shows diagrammatically a vessel 10, which may be, for example, a blast furnace or a cupola. A high-temperature liquid L discharges from the vessel through a duct 12 into a receiver 13. The duct contains a valve 14, constructed in accordance with my invention and hereinafter described, for regulating flow therethrough. Typically the liquid discharges continuously and the valve is adjusted to regulate the flow to maintain a particular set of conditions in the vessel 10 or receiver 13. In the example the receiver rests on a scale 15, which transmits a signal representative of the weight of material in the receiver. This signal goes to a conventional control device 16, which in turn transmits a signal to a conventional motorized valve positioner 17. The latter automatically adjusts valve 14.

Figure 2:
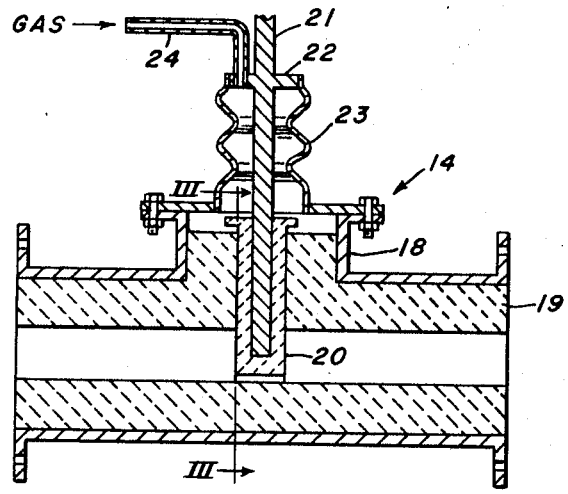
FIGURE 2 is a vertical longitudinal section of my valve.

As FIGURE 2 shows, valve 14 includes a body 18 fixed to duct 12. Both the duct and valve body are lined with a refractory 19 which is inert to the liquid L. In the example of molten iron, alumina is a suitable refractory. The refractory lining of the valve body 18 has a vertical slot within which I mount a vertically movable valve plug 20 of similar refractory. A rod 21 of heat-resistant metal, such as stainless steel, is fixed to the plug and extends upwardly to the valve positioner 17. Rod 21 carries a flange 22 intermediate its length. I fix the upper and lower ends of a flexible metal bellows 23 to flange 22 and to the top of the valve body 18 respectively. I connect a gas inlet tube 24 to flange 22. I admit an inert gas to the bellows via tube 24 under sufficient pressure to overcome the pressure of liquid L and thus effect a seal. The bellows of course expands and contracts as plug 20 and rod 21 move up and down.

Figure 3:
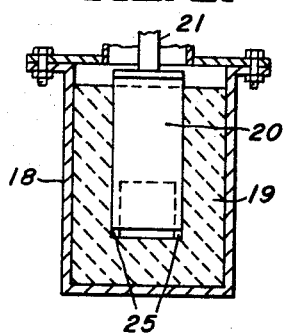
FIGURE 3 is a cross section on line III—III of FIGURE 2.
Figure 4:
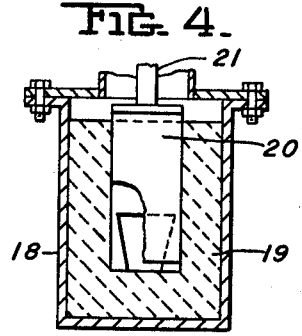
FIGURE 4 is a section similar to FIGURE 3, but showing a modification.

As FIGURES 3 and 4 show, plug 20 is of rectangular outline. The passage through the duct and valve body may be rectangular in cross section, as FIGURE 3 shows, or of some other configuration, such as the downwardly tapered cross section which FIGURE 4 shows. The refractory lining 19 has grooves 25 opposite the passage to accommodate the plug. I may use the valve either to regulate flow, as already explained, or to close off the duct entirely.

From the foregoing description it is seen that my invention affords a simple valve structure for regulating or closing off flow of high-temperature liquids, such as molten metal or slag. By reason of its simplicity, the valve constitutes a practical means for regulating flow from a blast furnace which is tapped continuously.

I claim:
1. The combination, with a substantially horizontal refractory lined duct having a passage for conducting high-temperature liquids, of a valve comprising:
   a refractory lined body fixed to said duct;
   the lining of said body having a passage communicating with the duct passage, a solid bottom wall beneath its passage, and an opening extending upwardly from its passage;
   a refractory plug mounted in said body for vertical movement within said opening transversely of the body passage and adapted to extend into the body passage to regulate the rate of flow therethrough;
   a rod fixed to the top of said plug and extending above said body for raising and lowering the plug and supporting the plug when raised from its lowermost position;
   a flange carried by said rod above said body;
   an expansible bellows fixed at its ends to said flange and to said body; and
   means connected through said flange for admitting gas under pressure to the interior of said bellows to effect a seal against escape of liquid from the body passage.
2. A valve as defined in claim 1 in which the refractory lining of said body has grooves opposite its passage accommodating said plug.

3. A valve as defined in claim 1 in which the body passage is of rectangular cross section.

4. A valve as defined in claim 1 in which the body passage is of downwardly tapered cross section.

5. A valve as defined in claim 1 further comprising automatic means operatively connected with said rod for positioning said plug and thereby adjusting the rate of flow through said passages.

References Cited

UNITED STATES PATENTS

| | | | |
|---|---|---|---|
| 2,495,081 | 1/1950 | Thomas | 251—335 XR |
| 2,506,936 | 9/1950 | Murray | 137—375 XR |
| 2,575,464 | 11/1951 | Olsen | 137—375 |
| 2,782,620 | 2/1957 | Roth et al. | 137—408 XR |
| 2,845,944 | 8/1958 | Bock | 137—408 |
| 3,150,680 | 9/1964 | Becker et al. | 137—375 |
| 1,671,100 | 5/1928 | Cort et al. | 251—368 XR |
| 1,596,843 | 8/1926 | McDonnell | 251—326 XR |
| 1,544,987 | 7/1925 | Howard | 251—328 XR |

HENRY T. KLINKSIEK, *Primary Examiner.*

U.S. Cl. X.R.

137—340; 251—335, 368